Aug. 11, 1964 J. P. TALLEY 3,144,352
MAGNETIC TAPE HAVING A BINDER MIXTURE OF POLYURETHANE RESIN AND A COPOLYMER OF VINYLIDENE CHLORIDE AND ACRYLONITRILE
Filed Oct. 15, 1962
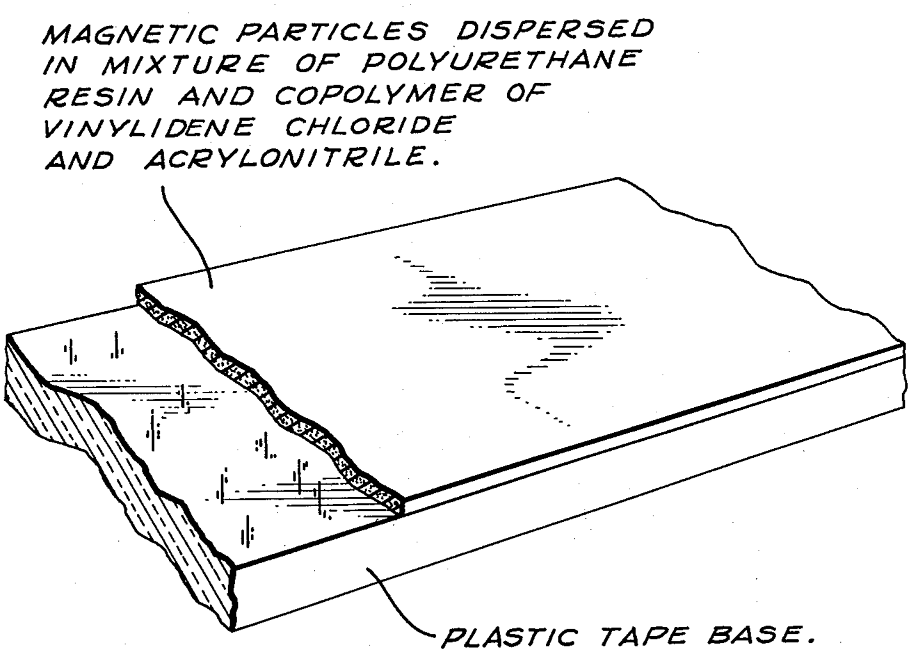
JAMES P. TALLEY
INVENTOR
BY Robert G. Clay
ATTORNEY United States Patent Office 3,144,352

Patented Aug. 11, 1964

3,144,352

MAGNETIC TAPE HAVING A BINDER MIXTURE OF POLYURETHANE RESIN AND A COPOLYMER OF VINYLIDENE CHLORIDE AND ACRYLONITRILE

James P. Talley, Auburn, Ala., assignor to Ampex Corporation, Redwood City, Calif., a corporation of California Filed Oct. 15, 1962, Ser. No. 230,755
3 Claims. (Cl. 117—138.8)

This invention relates to magnetic recording media and more particularly relates to a binder system wherein magnetic particles are dispersed in a solvent containing plastic mass to form a coating material, the coating material applied to a plastic backing, and the solvent removed to produce a plastic backing member having a tough adherent coating. Such recording media are ordinarily in the form of a tape, sheet or disk, having a coating containing magnetic particles. Such tapes or the like are well known to those skilled in the art, and the novel binder system of the present invention relates to the use of certain thermoplastic polyurethanes as the binder, which also contains a copolymer of vinylidene chloride-acrylonitrile.

Magnetic recording media which are used with high speed magnetic tape records, such as are component equipment units in electronic computers, must withstand numerous travels or passes through translational devices. Desirably, such magnetic recording media should be capable of withstanding hundreds of thousands of such passes through the translational devices.

Previously known magnetic recording media have not been able to withstand such a number of passes through translational devices, largely because of the wearing away of the surface coating on the magnetic recording media and the resultant effect of such wearing away upon reading and writing devices, guides, drive capstans, etc., of the translational devices, which causes erratic and unreliable performance.

Although the coatings of the present invention are useful with a wide variety of known tape bases, they are particularly useful in conjunction with the polyester bases of polyethylene terephthalate sold under the trade name of Mylar, since such bases have extremely long life and the coatings of the present invention have a life approaching that of the base material itself.

It has previously been proposed to prepare such binder systems utilizing reactive prepolymers of the type generally known as isocyanates. Such reactive prepolymers have reactive isocyanate groups and react with other materials to give linear polymers. It has now been found that a certain class of polyurethanes which do not have reactive isocyanate radicals yield superior coating formulations having extremely long wear characteristics, which hold a large percentage of active magnetic material, and which give good compliance over recording and reproducing heads. Further, in accordance with the present invention, it has been found that additional desirable properties can be imparted to the tape by the addition thereto of a copolymer of vinylidene chloride-acrylonitrile. The copolymer materially decreases the layer-to-layer adhesion of the coating, as well as improving the scratch resistance. Although tapes could be made with the copolymer alone as the binder, such tapes do not have satisfactory wear characteristics. Polyurethane increases the wear characteristics of the film and as little as 5% of the polyurethane may be added to the copolymer to produce a tape of enhanced wearing characteristics.

Thus, the present invention relates to a binder system wherein the binder comprises at least 5% of a polyurethane as hereinafter defined and the balance of the binder system is a copolymer of vinylidene chloride and acrylonitrile. Preferably, the binder system contains from 30% to 70% by weight of the resin, with the balance being the copolymer.

Polyurethane resins found useful in accordance with the present invention are thermoplastic elastomeric polyurethanes made by reacting p,p'-diphenylmethane diisocyanate, adipic acid and butanediol-1,4 in such proportions that all of the isocyanate groups have reacted to give a substantially unreactive polymer. This is accomplished by using an equivalent weight or an excess of the diol. Typical polyurethane resins which are suitable for the purposes of the present invention are sold under the trade name Estane and having the following characteristics:

| Properties | Resin Type | | |
|---|---|---|---|
| | X-1 | X-2 | X-7 |
| Specific Gravity | 1.21 | 1.19 | 1.22 |
| Hardness (Durometer A) | 88 | 65 | 96 |
| Tensile Strength at 73.4° F. (p.s.i.) | 5,840 | 5,000 | 5,840 |
| 300% Modulus at 73.4° F. (p.s.i.) | 1,240 | 420 | 2,800 |
| Taber Abrasion Resistance (Gram loss—CS17 Wheel 1,000 gr./wheel, 5,000 rev.). | .0025 | 0.15 | .0023 |

A typical suitable copolymer resin of vinylidene chloride-acrylonitrile is sold under the trademark Saran F220 and is identified by the following physical properties: specific gravity, 1.60; tensile strength (lb./sq. inch), 7,000 to 7,500; percent elongation, 0–10%.

The novel binders of the present invention are combined with a magnetic pigment such as acicular gamma ferric oxide, although other magnetic pigments can be used. The binder system of the present invention permits the use of a larger percentage of the magnetic pigment, yielding a high output tape.

In addition to the binder and the pigment, suitable solvents are used in fabricating the resin mixture, as is hereinafter described in detail, and other additives are normally used such as a surfactant to aid in the dispersion of the pigment in the resin. In the examples, tetrahydrofuran alone or in combination with toluene is used as the solvent, but other suitable solvents can be substituted. Although in the examples lecithin is used as the surfactant, other non-ionic, cationic, or anionic surfactants such as lead naphthenate, calcium naphthenate or the various N-alkyl trimethylenediamines can be used as dispersing agents. Lubricants are also ordinarily incorporated in the composition, such as silicone oils, high melting point waxes, such as paraffin wax, high boiling hydrocarbon oils, and the like. In some tapes wherein difficulty with static electricity is anticipated, reticular carbon can be incorporated in the tape to render it conductive.

Normally, the binder compositions of the present invention are made by first preparing an initial slurry containing the magnetic material, the lubricant, the surfactant and a portion of the solvent for the resin. Sufficient solvent is used to make a thin slurry, and the slurry is dispersed in a pebble mill for a suitable period of time, such as 15 to 72 hours. In a separate vessel, a resin mixture is made containing the balance of the solvent and the resin. The solvent-resin mixture is then added with strong agitation to the magnetic slurry and grinding is continued for an additional period of 5 to 24 hours. The mixture is then filtered and can be applied to a plastic base by means of a knife coater, gravure coater or the like.

The drawing forming a part of this application illustrates a magnetic recording tape made in accordance with the present invention wherein a relatively thick plastic base has an adherent coating thereon, said coating comprising magnetic particles dispersed in a mixture of a polyurethane resin and a copolymer of vinylidene chloride and acrylonitrile.

The following non-limiting examples illustrate the practice of this invention.

*Example 1*

| Ingredient: | Parts by weight |
|---|---|
| Magnetic pigment | 600 |
| Polyurethane elastomer resin (X–1) | 100 |
| Vinylidene chloride-acrylonitrile copolymer | 100 |
| Lecithin | 30 |
| Solvents: | |
| Tetrahydrofuran | 560 |
| Toluene | 240 |

On subjecting the product of this example to a life-in-wear test, failure occurred in excess of 850,000 cycles.

*Example 2*

Example 2 was repeated except that resin X–2 was substituted and substantially the same result was obtained.

*Example 3*

| Ingredient: | Parts by weight |
|---|---|
| Magnetic pigment | 600 |
| Polyurethane elastomer resin (X–2) | 40 |
| Vinylidene chloride-acrylonitrile copolymer | 160 |
| Lecithin | 30 |
| Solvents: | |
| Tetrahydrofuran | 560 |
| Toluene | 240 |

On subjecting the product of this example to a life-in-wear test, failure occurred in excess of 750,000 cycles.

In the above examples, the life-in-wear test does not refer to mechanical failure but rather to magnetic failure wherein characters drop out of the tape so that satisfactory reproduction can no longer be obtained.

*Examples 4–13*

Satisfactory tapes were made following the general procedure of Example 2 except for the type and proportions of the resin as follows:

| Examples | Resin Type | Parts Resin | Parts Copolymer |
|---|---|---|---|
| 4 | X–2 | 160 | 40 |
| 5 | X–1 | 140 | 60 |
| 6 | X–2 | 120 | 80 |
| 7 | X–2 | 80 | 120 |
| 8 | X–1 and X–2 | 60 | 140 |
| 9 | X–2 | 30 | 170 |
| 10 | X–2 | 25 | 175 |
| 11 | X–2 | 20 | 180 |
| 12 | X–2 | 10 | 190 |
| 13 | X–7 | 100 | 100 |

Solvent consisted solely of tetrahydrofuran.

It is believed apparent from the foregoing that we have produced magnetic tapes of superior wear resistance.

Further, tests have shown that the tapes of the present invention cause extremely low head wear.

What is claimed is:

1. A long wear magnetic recording medium comprising a plastic base and an adherent coating, including a magnetic pigment dispersed in a resin mixture, said resin mixture comprising a polyurethane resin which is made by reacting a mixture consisting of p,p'-diphenylmethane diisocyanate, adipic acid and butanediol-1,4 which resin is free of reactive isocyanate groups and a copolymer of vinylidene chloride and acrylonitrile, at least 5% of the resin mixture consisting of said polyurethane resin, said copolymer having about 1. specific gravity, from 7,000 to 7,500 lbs./sq. inch tensile strength, and from 0–10% elongation.

2. A long wear magnetic recording medium comprising a plastic base and an adherent coating, including a magnetic pigment in dispersing medium, said medium comprising a polyurethane resin which is made by reacting a mixture consisting of p,p'-diphenylmethane diisocyanate, adipic acid and butanediol-1,4, said resin being free of reactive isocyanate groups, and a copolymer of vinylidene chloride and acrylonitrile, said dispersing medium containing from 30% to 70% by weight of the polyurethane resin, the balance being copolymer, said copolymer having about 1.6 specific gravity, from 7,000 to 7,500 lbs./sq. inch tensile strength, and from 0–10% elongation.

3. A recording medium in accordance with claim 2 wherein the coating consists essentially of 600 parts of magnetic pigment, 100 parts of resin and 100 parts of copolymer, all parts being by weight.

References Cited in the file of this patent

UNITED STATES PATENTS

| | | |
|---|---|---|
| 2,454,678 | Smith et al. | Nov. 23, 1948 |
| 2,606,162 | Coffey et al. | Aug. 5, 1952 |
| 2,806,836 | Nischk et al. | Sept. 17, 1957 |
| 2,882,260 | Bartl et al. | Apr. 14, 1959 |
| 2,888,433 | Parker | May 26, 1959 |
| 2,978,414 | Harz et al. | Apr. 4, 1961 |
| 2,989,415 | Horton et al. | June 20, 1961 |
| 3,049,442 | Haines et al. | Aug. 14, 1962 |

FOREIGN PATENTS

| | | |
|---|---|---|
| 814,225 | Germany | Sept. 20, 1951 |

OTHER REFERENCES

Golding, B.: "Polymers and Resins," N.Y., Von Nostrand Co., Inc., 1959, pp. 325–335.

Dombrow: "Polyurethanes," N.Y., Reinhold Publishing Corp., 1957, p. 142.